April 23, 1957 — H. L. WOELLNER — 2,789,859
GRAPPLE FOR REELS
Filed Jan. 5, 1955 — 2 Sheets-Sheet 1
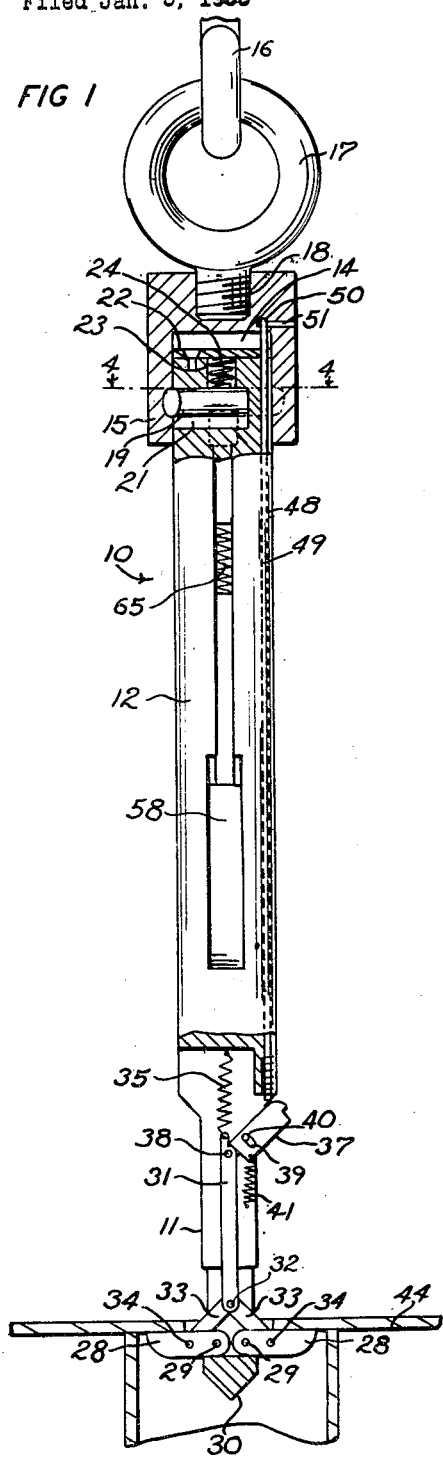
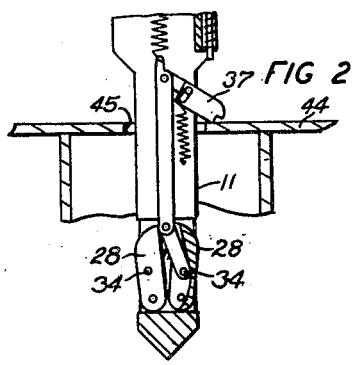
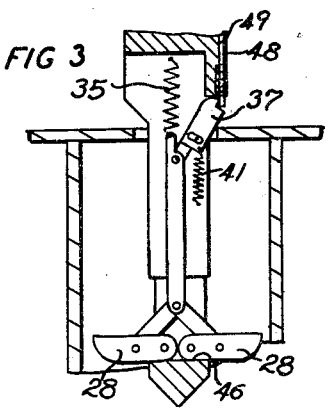
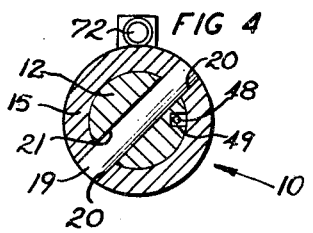
INVENTOR
H. L. WOELLNER
By W. C. Parnell
ATTORNEY

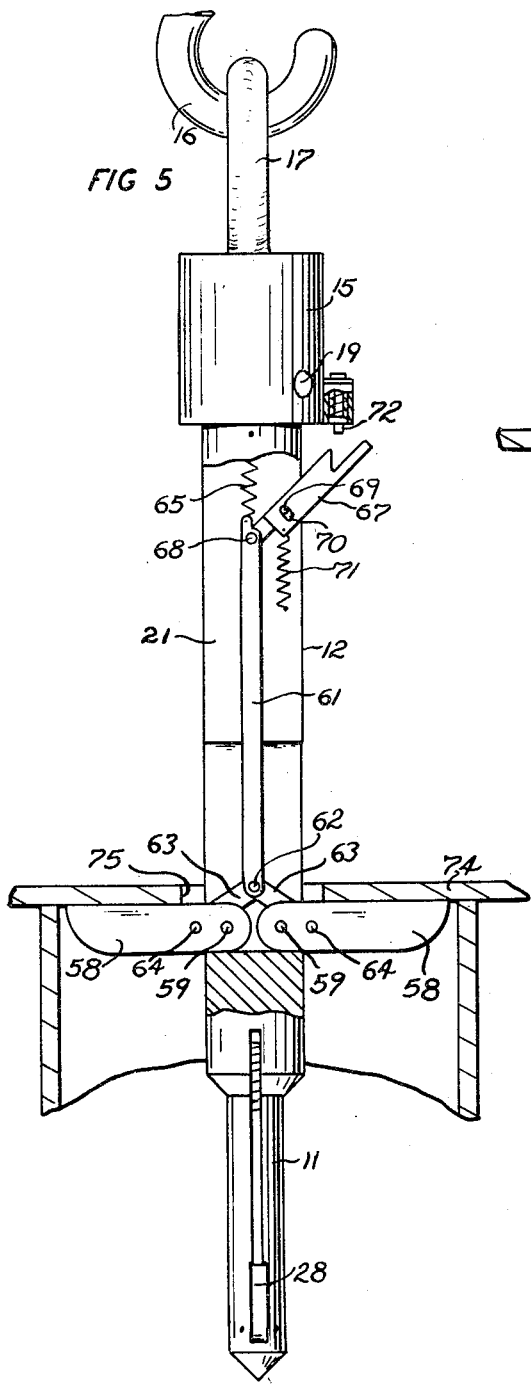
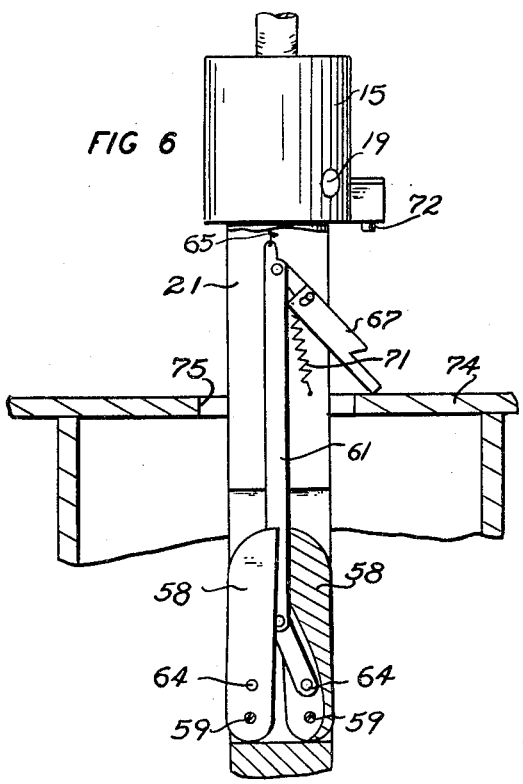
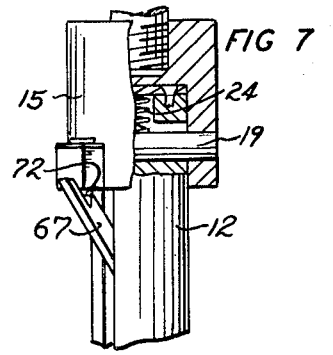

United States Patent Office 2,789,859
Patented Apr. 23, 1957

2,789,859

GRAPPLE FOR REELS

Horst L. Woellner, Buffalo, N. Y., assignor to Western Electric Company, Incorporated, New York, N. Y., a corporation of New York Application January 5, 1955, Serial No. 479,947

6 Claims. (Cl. 294—90)

This invention relates to reel grapples particularly reel grapple attachments for portable hoists.

There are many commercially known grapples for attachment to reels when in standing or rollable positions but in certain instances it is desirable to transport reels of different sizes in other positions that is, when they are initially lying on one of their heads leaving the other heads thereof uppermost. Certain problems arise when considering transporting reels in the lying or horizontal positions in that the over all dimensions of the upper or exposed heads of the reels vary in size and the arbor holes of these heads vary correspondingly in size.

The object of the invention is to provide the solutions to these problems in a reel grapple readily attachable to reels of different sizes for transporting them through the aid of a hoist.

With this and other objects in view the invention comprises a reel grapple attachment for portable hoist including an elongate body having hollow portions adapted to be moved downwardly into an arbor hole in a head of a reel and including pivotally supported arms normally housed in one of the hollow portions with means to move the arms outwardly to engage the undersurface of the head of the reel to support the reel while being transported by the hoist.

In the present embodiment of the invention, the reel grapple attachment is designed for reels of different sizes, thereby including in the body, portions of different cross-sectional dimensions with sets of supporting arms normally housed in hollow parts of these portions. Like, but separate, means are provided to urge the sets of arms into their normal positions while elements are located to be actuated by the respective reels of different sizes to force their respective arms outwardly and to be latched in this position until the weight of the respective reel on the arms causes unlatching of the elements for automatic return of the arms to their normal positions when the reel supported thereby has been deposited at a desired location.

Other objects and advantages will be apparent from the following detailed description when considered in conjunction with the accompanying drawings, wherein:

Fig. 1 is a front elevational view of the grapple attachment carried by a hoist and shown supporting one of the smaller reels;

Fig. 2 is a fragmentary sectional view of the lower portion of the grapple shown entering an arbor hole of a smaller reel;

Fig. 3 is a view of the structure shown in Fig. 2 after the lower arms have been actuated into latched supporting position;

Fig. 4 is a horizontal sectional view taken along the line 4—4 of Fig. 1;

Fig. 5 is a side elevational view of the grapple shown operated to support a larger reel;

Fig. 6 is a fragmentary sectional view of the grapple attachment entering a larger reel, and Fig. 7 is a fragmentary sectional view illustrating the upper element shown in Figs. 5 and 6, latched in operated position.

Referring now to the drawings, attention is directed first to Figs. 1 to 4 inclusive, illustrating the grapple attachment as having an elongate body, indicated generally at 10, with hollow portions 11 and 12 of different sizes or cross-sectional dimensions. The body 10 has its upper end movably disposed in a recess 14 of a head 15, which is a part of the means interposed by the body 10 and a portable hoist, the only part of which is shown is a hook 16. A connecting ring 17 fastened to the hook 16 of the hoist is threadedly mounted at 18 in the head 15 and a pin or rod 19 with its ends disposed in apertures 20 (Fig. 4) extends through what may be defined as an elongate opening 21 in the upper portion of the body 10. The elongate opening 21 permits relative axial movement of the body 10 and the head 15. A cover plate 22 mounted on the upper end of the body 10 extends over an aperture 23 in which a compressible spring 24 is disposed. The spring 24 engages the rod 19 and holds the head 15 substantially seated on the upper end or cover plate 22 of the body 10, yet is capable of being compressed by the weight of a reel being transported.

The lower and smaller hollow portion 11 of the body 10 has a set of arms 28 disposed therein and movably mounted on pivot pins 29 which have their ends supported in apertures of the hollow portion 11 short of a pointed end 30 of the body 10. A pull rod 31, pivotally connected at 32 to the upper ends of links 33, the lower ends of which are pivotally connected at 34 to their respective arms 28, is disposed in the hollow portion 11 and is urged upwardly by a spring 35 completing the means to urge the arms 28 into their normal positions shown in Fig. 2. An element 37, pivotally connected at 38 near the upper end of the rod 31, has an elongate opening 39 providing a variable connection with a pivot pin 40 and is normally urged clockwise by a spring 41 to cooperate with the spring 35 in returning the arms as well as the element to their normal positions. When in the normal positions, as shown in Fig. 2, the arms 28 are housed in the hollow portion 11, while the element 37 is positioned to engage the upper surface of a head of a small reel 44.

While the portion 11 with its housed arms 28 and other mechanism is moved downwardly into the arbor hole 45 of the reel, as illustrated in Figs. 2 and 3, the element 37, when engaging the reel will move against the forces of the springs 35 and 41 until the arms are in horizontal alignment partially supported by a surface 46 (Fig. 3). At this time, the element 37 is latched in operated position by a pin-like latch 48 positioned in a vertical groove 49 in the portion 12 of the body 10. The latch pin 48 has its upper end 50 fixed to the head 15 by a pin 51 so that the latch pin will move upwardly with the head and the hoist hook 16 relative to the body 10, to release the element 37 as a result of the weight of the reel on the arms 28 compressing the spring 24. This allows the element 37 to be moved by its weight and by the spring 41 a distance determined by the elongate aperture 39 free of the latch pin 48 so that when the reel is deposited and its weight removed from the arms during lowering of the body into the reel, the arms 28 will return to their normal housed positions.

The portion 12 of the body 10 is similar to that of the portion 11 with the exception of the differences in the size of the portion, its cavity and the mechanism housed therein. A larger set of arms 58 are disposed in the elongate opening 21 of the hollow portion 12 and movably mounted on pivot pins 59 which have their ends mounted in apertures of the hollow portion 12 short of the reduced portion 11. The larger set of arms 58 has an actuating means including a pull rod 61 with its lower end pivotally connected at 62 to the upper ends of links 63, the lower ends of the links being pivotally connected at 64 to the arms 58. A spring 65 normally urges the pull rod upwardly while an element 67, pivotally connected at 68 to the rod 61, serves as a means to actuate the rod and the arms into the open supporting positions shown in Fig. 5. The element 67 is supported by a pivot 69 through an elongate opening 70 and is urged clockwise about the pivot 68 by a spring 71. A spring-pressed plunger 72 carried by the head 15 is positioned to latch the element 67 in its operated position until freed as a result of the weight of a reel 74 on the arms 58 compressing the spring 24. The reel 74 is larger than the reel 44 and has a larger arbor hole 75 through which the lower or smaller portion 11 may pass without causing actuation of the element 37 (Figs. 1, 2 and 3). However, the element 67 will engage the upper surface of the reel 74 and will be rocked counterclockwise moving the rod 61 downwardly and the arm 58 outwardly until it is latched in place by the plunger 72 where the arms 58 will be held until the grapple is raised upwardly by the hoist hook 16 and the arms engage the undersurface of the upper head of the reel 74.

Considering the operation of the grapple, it will be apparent that the grapple is completely automatic in its actions, relying on the skill of the hoist operator only in guiding the grapple into the arbor holes of the reels of various sizes. When entering the arbor holes 45 of smaller reels 44, it is impossible for the upper arms 57 or the associated mechanism of the larger portion 12 to function owing to the fact that this portion is not acceptable in the smaller arbor holes of reels of this size. Furthermore, the housing of the arms 28 in the hollow portion 11 removes any obstruction in the area of the portion 11 while entering the arbor hole of the small reel excepting the element 37 which brings about actuation of the mechanism associated therewith. The grapple when lowered into the arbor hole of the smaller reel moves downwardly until it stops and during the last portion of this movement the element 37 is moved from the position shown in Fig. 2 to that shown in Fig. 3, forcing the rod 31 downwardly and the arms 28 outwardly. This mechanism is held in this position by the pin-like latch 48, while the grapple is moved upwardly by the hoist, the weight of the body 10 and the associated parts being supported by the spring 24. However, when the weight of the reel is added to the grapple, the spring 24 is compressed allowing the body 10 and all portions carried thereby to rest directly on the rod 19, resulting in relative movement of the head 15 and the body including the latch pin 48, which has been moved free of the element 37, allowing it to drop a short distance into the position shown in Fig. 1. As soon as the reel 44 being transported is lowered and allowed to come to rest on a given support, additional downward movement of the grapple will result in the spring 35 returning the arms 28 to their normal positions so that the grapple may be removed from the transported reel and moved on to another reel.

If the next reel to be transported is a larger reel 74, the grapple will be lowered into this reel without causing actuation of the arms 28 owing to the fact that the arbor hole 75 is too large to permit the element 37 to be actuated. However, the element 67 will be actuated by engagement with the upper surface of the reel 74 causing the rod 61 to force the arms 58 outwardly into the supporting position shown in Fig. 5 where the element will be latched by the plunger 72 until the weight of the reel 74 causes the spring 24 to be compressed, at which time the plunger 72 will be moved free of the latch 67 allowing it to drop into the position shown in Fig. 5, conditioning the spring 65 to return the arms 57 to their normal housed positions after the reel 74 has been brought to rest and the grapple lowered an additional distance to free the arms. It is, therefore, apparent that the operation of the grapple, whether it be for smaller reels or larger reels, is completely automatic in gripping and freeing the reels, requiring no direct action by the operator of the hoist other than the movements of the hoist necessary for the initial attachments and the subsequent disengagement of the sets of arms.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A grapple for transporting reels having holes in heads thereof, the grapple comprising a supporting element adapted to be attached to a hoist, an elongate body having its upper end movably attached to the element, its lower end pointed to guide the body into holes of successive reel heads and an intermediate hollow portion, a set of arms pivotally supported and normally housed in the hollow body portion, a lever pivotally supported by the body and normally positioned to engage a head of a reel, when the body is lowered into the hole thereof, to be moved thereby to an operated position away from its normal position, means operatively connecting the lever to the arms to cause movement of the arms outwardly into positions to engage the undersurface of the head and support the reel when the lever is moved into its operated position, means normally urging the arms into the hollow body, means to latch the lever in its operated position until the reel is raised by the arms, and means rendered effective by the weight of the reel on the arms to unlatch the lever to render the urging means of the arms effective to return the arms to their normal positions when freed of the weight of the reel.

2. A grapple for transporting reels having holes in heads thereof, the grapple comprising a supporting element adapted to be attached to a hoist, an elongate body having its upper end movably attached to the element, its lower end pointed to guide the body into holes of successive reel heads and an intermediate hollow portion, resilient means interposed between the body and the supporting element to allow relative movement thereof resulting from the weight of a reel, a set of arms pivotally supported and normally housed in the hollow body portion, a lever pivotally supported by the body and normally positioned to engage a head of a reel, when the body is lowered into the hole thereof, to be moved thereby to an operated position away from its normal position, and means operatively connecting the lever to the arms to cause movement of the arms outwardly into positions to engage the undersurface of the head and support the reel when the lever is moved into its operated position, a latch carried by the supporting element to engage and hold the lever in its operated position until the movement of the lever and body relative to the latch and supporting element under the weight of the reel frees from the lever from the latch.

3. A grapple for transporting reels of different sizes having holes of correspondingly different sizes in heads thereof, the grapple comprising a supporting element adapted to be attached to a hoist, an elongate body having its upper end attached to the supporting element, its lower end pointed to guide the body into the holes of different sizes of the reels of different sizes and intermediate hollow portions of different cross-sectional dimensions, the smallest portion being disposed adjacent the lower end and the largest portion being disposed adjacent the upper end of the body, sets of arms of different lengths pivotally supported and normally housed in their respective hollow body portions, and separate means including levers pivotally carried by the body and adapted for actuation, when the levers are moved into engagement with and actuated by the stationary heads of their respective reels during lowering of the body into the holes thereof singly, to force their respective set of arms to swing outwardly about their pivots into positions to engage the undersurface of their respective reel head and support the reel during upward movement of the body.

4. A grapple for transporting reels of different sizes having holes of correspondingly different sizes in heads thereof, the grapple comprising a supporting element adapted to be attached to a hoist, an elongate body having its upper end attached to the supporting element, its lower end pointed to guide the body into the holes of different sizes of the reels of different sizes and intermediate hollow portions of different cross-sectional dimensions, the smallest portion being disposed adjacent the lower end and the largest portion being disposed adjacent the upper end of the body, sets of arms of different lengths pivotally supported and normally housed in their respective hollow body portions, separate means including levers pivotally carried by the body and adapted for actuation, when the levers are moved into engagement with and actuated by the stationary heads of their respective reels during lowering of the body into the holes thereof singly, to force their respective set of arms to swing outwardly about their pivots into positions to engage the undersurface of their respective reel head and support the reel during upward movement of the body, and latches carried by the element and actuable to releasably retain the levers of their respective arm actuating means to hold their respective arms in their supporting positions.

5. A grapple for transporting reels of different sizes having holes of correspondingly different sizes in heads thereof, the grapple comprising a supporting element adapted to be attached to a hoist, an elongate body having its upper end attached to the supporting element, its lower end pointed to guide the body into the holes of different sizes of the reels of different sizes and intermediate hollow portions of different cross-sectional dimensions, the smallest portion being disposed adjacent the lower end and the largest portion being disposed adjacent the upper end of the body, sets of arms of different lengths pivotally supported and normally housed in their respective hollow body portions, separate means including levers pivotally carried by the body and adapted for actuation, when the levers are moved into engagement with and actuated by the stationary heads of their respective reels during lowering of the body into the holes thereof singly, to force their respective set of arms to swing outwardly about their pivots into positions to engage the undersurface of their respective reel head and support the reel during upward movement of the body, latches carried by the element and actuable to releasably retain the levers of their respective arm actuating means to hold their respective arms in their supporting positions, means rendered effective during the hoisting of any reel on any set of the arms to release any of the latches, and separate means normally urging the arms from their reel supporting positions to their normal positions in their hollow body portions.

6. A grapple for transporting reels of different sizes having holes of correspondingly different sizes in heads thereof, the grapple comprising a supporting element adapted to be attached to a hoist, an elongate body having its upper end attached to the supporting element, its lower end pointed to guide the body into the holes of different sizes of the reels of different sizes and intermediate hollow portions of different cross-sectional dimensions, the smallest portions being disposed adjacent the lower end and the largest portion being disposed adjacent the upper end of the body, sets of arms of different lengths pivotally supported and normally housed in their respective hollow body portions, separate means including levers pivotally carried by the body and adapted for actuation, when the levers are moved into engagement with and actuated by the stationary heads of their respective reels during lowering of the body into the holes thereof singly, to force their respective set of arms to swing outwardly about their pivots into positions to engage the undersurface of their respective reel head and support the reel during upward movement of the body, latches carried by the element and actuable to releasably retain the levers of their respective arm actuating means to hold their respective arms in their supporting positions, and resilient means interposed between the supporting element and the body to allow relative movement thereof during lifting of a reel to move the latches free of their levers to free the arms to return to their normal position in their hollow body portions when the weight of a reel is removed therefrom.

References Cited in the file of this patent

UNITED STATES PATENTS

| | | |
|---|---|---|
| 735,616 | Stitt | Aug. 4, 1903 |
| 744,583 | Meaders | Nov. 17, 1903 |
| 880,404 | Sanford | Feb. 25, 1908 |
| 2,155,620 | Scaramucci | Apr. 25, 1939 |
| 2,262,811 | McDaniels et al. | Nov. 18, 1941 |
| 2,302,330 | Kothny | Nov. 17, 1942 |
| 2,305,320 | Rea | Dec. 15, 1942 |
| 2,491,082 | Muhlbach | Dec. 20, 1949 |
| 2,610,082 | Hill | Sept. 9, 1952 |

FOREIGN PATENTS

| | | |
|---|---|---|
| 817,609 | Germany | Oct. 18, 1951 |
| 685,790 | Great Britain | Jan. 14, 1953 |